United States Patent
Thompson

(10) Patent No.: US 7,283,543 B1
(45) Date of Patent: Oct. 16, 2007

(54) SYSTEM AND METHOD FOR OPERATING ECHO CANCELLERS WITH NETWORKS HAVING INSUFFICIENT LEVELS OF ECHO RETURN LOSS

(75) Inventor: Leland O. Thompson, Carpentersville, IL (US)

(73) Assignee: 3Com Corporation, Marlborough, MA (US)

( * ) Notice: Subject to any disclaimer, the term of this patent is extended or adjusted under 35 U.S.C. 154(b) by 965 days.

(21) Appl. No.: 10/306,328

(22) Filed: Nov. 27, 2002

(51) Int. Cl.
*H04L 12/28* (2006.01)

(52) U.S. Cl. .................... 370/401; 379/406.05

(58) Field of Classification Search ........... 370/401, 370/331, 286, 289, 290, 268, 269, 352; 379/406.05, 379/388.03; 704/225; 375/254
See application file for complete search history.

(56) References Cited

U.S. PATENT DOCUMENTS 6,628,957 B1 * 9/2003 Weaver et al. ............ 455/522
7,092,365 B1 * 8/2006 Tackin et al. ............ 370/286

* cited by examiner

*Primary Examiner*—Chi Pham
*Assistant Examiner*—Alexander O. Boakye
(74) *Attorney, Agent, or Firm*—McDonnell Boehnen Hulbert & Berghoff LLP

(57) ABSTRACT

A system and method for providing an apparent echo return loss is provided. A communications network may include a gateway coupled to a local exchange network. The gateway may receive signals from a packet network and output signals to a circuit switched network, which may output return signals to the gateway. The local exchange network may provide an echo return loss on signals received from the gateway. The gateway may also provide an initial echo return loss to signals prior to sending the signals to the network. The echo return loss provided by both the gateway and the local exchange network may enable the gateway to determine when to trigger adaptation in order to provide estimates of echo signals generated by the network, and to subsequently eliminate these echo signals from the return signals.

36 Claims, 8 Drawing Sheets

SYSTEM AND METHOD FOR OPERATING ECHO CANCELLERS WITH NETWORKS HAVING INSUFFICIENT LEVELS OF ECHO RETURN LOSS

FIELD OF INVENTION

The present invention relates to telecommunications and, more particularly, to a system and method for operating echo cancellers with networks having insufficient levels of echo return loss.

BACKGROUND

In a typical telephone network, such as the public switched telephone network (PSTN), signals carrying data travel bi-directionally through the network (i.e., from a transmitting point to a receiving point and from a receiving point to a transmitting point). Echo is one result of this bi-directionality characteristic of the network. Echo is an attenuated and distorted replica of a signal, which can be caused by the transmission and reception of the signal on a common line. For example, in a telephone network that involves both 4-wire and 2-wire links, echoes arise due to impedance mismatches in a hybrid that converts the 4-wire to the 2-wire link. Echo is acceptable if a small delay is present since telephone users are accustomed to hearing an immediate echo. However, echo can become a larger problem as a signal path delay increases, such as within a long distance link with an even longer delay.

One approach to solve this problem is to implement an echo canceller at the network interface. A standard echo canceller performs an adaptive algorithm, which estimates a model (impulse response) of the network echo path. The echo canceller may be positioned to receive return signals from a network and adaptively subtract a replica of an estimated echo signal from the return signal in order to achieve echo cancellation. The echo canceller can continuously adapt to varying echo signals and modify its model of the estimated echo signal path accordingly.

It may be desirable for echo cancellers to have the following fundamental features: rapid convergence, subjective low returned echo levels during single talk, and low divergence during double talk. Real echo paths in real networks make this more than challenging. Sometimes it is impossible to meet sufficient performance criteria in order to completely eliminate echo from a user's listening experience. Most of these "impossible" situations are brought about by certain network conditions, certain mixed network topologies, or even certain network configurations.

The ITU-T has worked to diligently define the standard network echo canceller. (reference is made to ITU-T G.165/ G.168). A standard echo canceller designed to meet the fundamental features probably will perform properly for echo loss (e.g., amount of attenuation of echo signals provided by the network) of 6 decibel (dB) or greater. For echo loss less than 6 dB, standard echo cancellers may still work but with degraded performance. (The difference amount of attenuation of the echo signals provided by the network is known as Echo Return Loss (ERL) and is measured in dB.)

The above standards define the terminology to describe a typical echo scenario in the Public Switch Telephone Network (PSTN). Because real applications are moving to hybrid networks (Circuit and Packet switched), there are certain requirements for echo cancellation on local networks that, until now were thought to be unnecessary. This provides an opportunity to extend and leverage existing standard methods to provide a novel solution to current mixed network (converged network) issues. The goal is improving performance in environments that have often been neglected or have had reduced performance expectations associated with them.

However, distinguishing echo signals from desired signals can be difficult due to double-talk situations. Double-talk occurs when two people, one on the receiving side of the network and one on the transmitting side of the network, speak simultaneously. The dual transmission and reception of signals disrupts echo canceller adaptation, and as a result, the echo canceller may perform poorly if a robust double-talk detector is not employed. When no double-talk exists, the echo canceller can properly adapt its model of the echo signal path since the echo canceller only receives a signal that contains the echo. But during double-talk, the receiving side also transmits signals along a return signal path. Therefore, the echo canceller receives both return echo signals and signals transmitted from the receiving end simultaneously, and therefore may adapt improperly. Thus, a problem arises if the echo canceller erroneously adapts its model of the estimated echo signal according to a transmitted signal rather than according to an echo signal. The echo canceller may begin to distort transmitted signals. And for echo cancellers that employ Non-Linear Processors (NLP) to improve echo canceller performance, these challenges become especially important. The ERL used when employing such echo cancellers typically has a minimum value of 6 dB. It should be noted that 6 dB is a typical worst case value encountered for most networks, and most current networks have typical ERL values larger than this.

To properly determine double-talk conditions, to allow decision logic to decide when and when not to allow adaptation, and to correctly engage an NLP algorithm, an ITU-compliant echo canceller typically requires a 6 dB difference in power levels between transmitted signals and associated return echo signals. Therefore, typical echo canceller implementations used in the industry do not operate robustly and well-behaved (e.g., performance equal to or better than the standard and stable echo canceller) if less than 6 dB ERL is present. Because standard network echo cancellers require 6 dB of ERL to function properly, they are typically unsuitable for use within networks that do not provide 6 dB of ERL. But, networks that have less than 6 dB of ERL also have echo path delays that are so small such that the side-tone (i.e., receiver amplification loop from microphone to speaker) of typical analog telephones would cover this echo, and the echo canceller may be unnecessary for these small delay path networks. However, recently it has become important, because of mixed networks (circuit switched and packet switched such as ATM, Frame Relay, IP, Cellular, Satellite, etc.) to provide echo cancellation in areas where ERL is less than 6 dB and the end-to-end delay through this mixed network is large enough to mandate robust echo cancellation in order to meet the performance expectations of a traditional circuit switched network.

SUMMARY

Generally speaking, the present invention may provide a mechanism to provide an apparent ERL to trigger adaptation of an echo canceller according to modified measurements of ERL.

In an exemplary embodiment, a packet gateway is provided that includes a network interface that may transfer signals to a voice communication device via a circuit switched network. The circuit switched network will produce echo(s) and provide an ERL value. The packet gateway may also include a processing unit coupled to the network interface. The processing unit typically transmits a signal to the (circuit or packet) network and receives a return signal from the (circuit or packet) network. The processing unit includes an echo canceller, which includes an adaptive filter that cancels echo signals within the return signal. A specified amount of power level difference between the transmitted signal and the return signal is required by the processing unit in order for the processing unit to trigger adaptation of the adaptive filter. The network may provide at least a portion of ERL on the return signal and the processing unit may provide a remainder of ERL to provide the specified amount of power level difference enabling the processing unit to trigger adaptation of the adaptive filter. The remainder of the specified amount is referred to herein as "apparent ERL." The processing unit may provide the apparent ERL so as to provide a portion of the specified amount of power level difference.

In one respect, the packet gateway of the exemplary embodiment may include an echo canceller that has an adaptive filter able to cancel the echo in the signal. The gateway may also include an attenuation means coupled to the echo canceller to provide the apparent ERL. The gateway may further include various echo canceller modules such as a double-talk detector (DTD), a non-linear processor (NLP), and comfort noise insertion (CNI), coupled to the echo canceller and the attenuation means. The double-talk detector may determine when the return signal includes non-echo signals in order to disable (e.g., freeze) adaptation of the adaptive filter and disable the NLP. Strategically modified signal waveforms are preferably provided to these various echo canceller modules thereby providing apparent ERL.

In another respect, the gateway of the exemplary embodiment may additionally or alternatively include an amplification means coupled to the echo canceller. The amplification means may be used to increase the magnitude of a transmitted signal to produce an amplified signal to an appropriate signal path in the network processor. In this manner, the double-talk detector and adaptive filter may receive the amplified signal from the amplification means in order to enhance the overall performance of the echo cancellation on this particular connection. This is accomplished by comparing the amplified signal, from the echo canceller's reference delay line, with the signal that was sent to the network to determine when the return signal includes non-echo signals to disable adaptation of the adaptive filter. Note that the double-talk detector certainly may provide more complexity than just a simple power comparison including, but not limited to, autocorrelation and error monitoring. By operating on signals modified in this way, the echo canceller provides apparent ERL, thereby allowing adaptation when the actual ERL provided by a circuit switched network is less than the typically required threshold of 6 dB.

In still another respect, the exemplary embodiment may take the form of a method of triggering adaptation by the gateway. The method may be performed within a system that is operable to transmit signals from a gateway to a network and receive signals from the network into the gateway. The method may include providing an apparent ERL on the transmitted and received signals by the gateway, thereby providing an enhanced power level difference between a transmitted signal and its received echo. The method may further include triggering adaptation by the adaptive filter utilizing a dynamic means of calculating ERL for any given connection and implementing the appropriate and necessary level of apparent ERL in order to allow improved echo canceller performance beyond the current industry standard requirements for these same types of circuit connections and ERL values.

These as well as other features and advantages will become apparent to those of ordinary skill in the art by reading the following detailed description, with appropriate reference to the accompanying drawings.

BRIEF DESCRIPTION OF FIGURES

Reference is made to the attached figures, wherein.

DETAILED DESCRIPTION OF EXEMPLARY EMBODIMENTS

Figure 1:
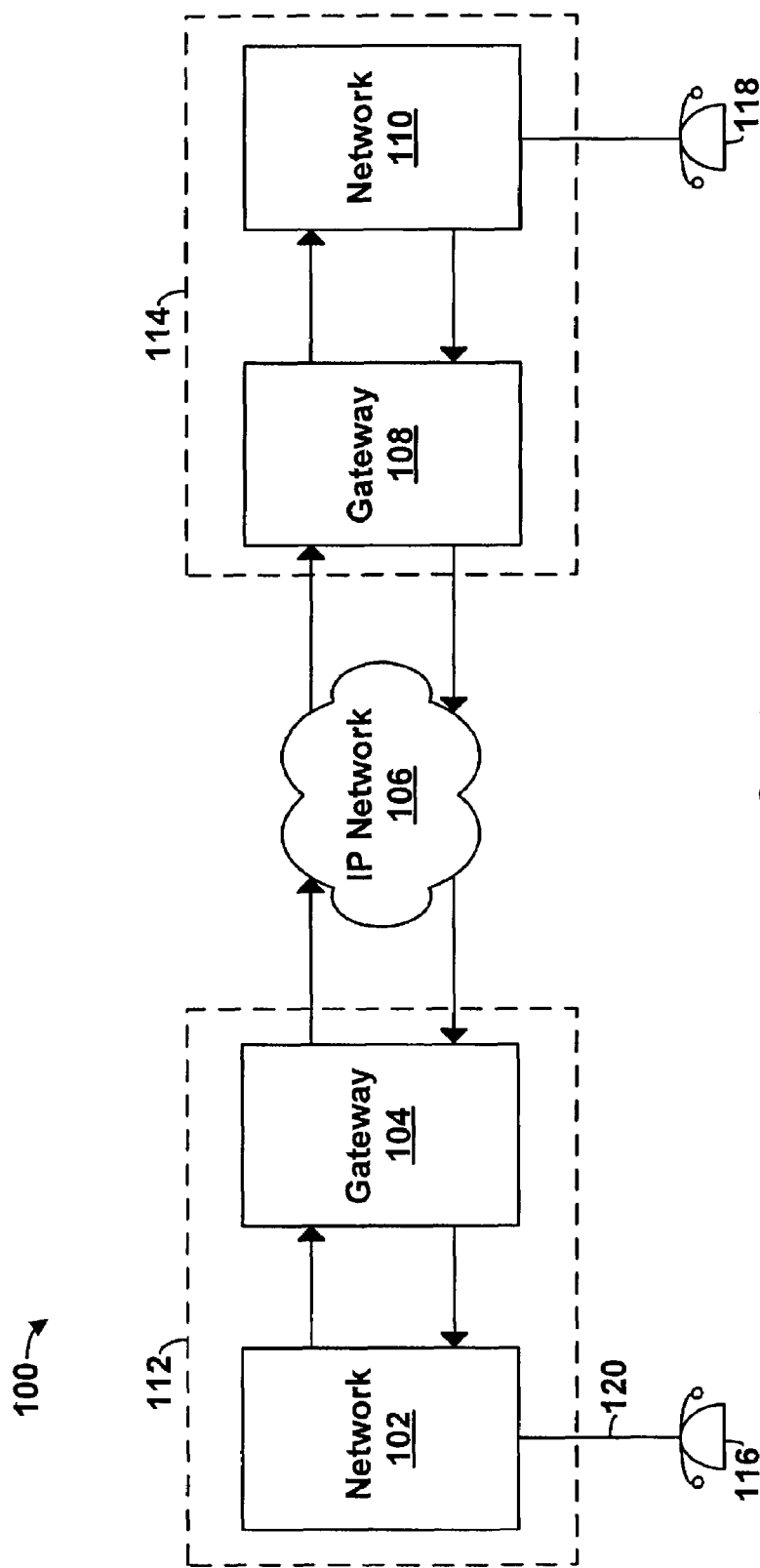
FIG. 1 is a block diagram illustrating one embodiment of a prior art system.

Referring now to the figures, and more particularly to FIG. 1, a block diagram of one embodiment of a prior art system 100 is illustrated. It should be understood that the system 100 illustrated in FIG. 1 and other arrangements described herein are set forth for purposes of example only, and other arrangements and elements can be used instead and some elements may be omitted altogether, depending on manufacturing and/or consumer preferences.

By way of example, system 100 includes a network 102 coupled to a gateway 104, which is coupled to a packet network 106. The system 100 also includes another gateway 108 coupled to the packet network 106. The gateway 108 is also coupled to a network 110. For purposes of illustration, the network 102 and gateway 104 may comprise a transmitting end 112 and the gateway 108 and the network 110 may comprise a receiving end 114. However, the system 100 may also operate bi-directionally as well. The couplings of the system 100 may be any typical connections (whether wired or wireless) such as, but not limited to, time division multiplexed lines such as trunk level 1 (T1) lines, packet switched lines such as Ethernet lines, or simplex or duplex phone lines including 2-wire or 4-wire circuits.

The network 102 and network 110 may be the PSTN, a local phone network, a local exchange carrier (LEC) network, or any other voice network. The networks 102, 110 may also be networks that have voice over IP (VoIP) capabilities as well. Furthermore, the networks 102, 110 may be asynchronous transfer mode (ATM) backhaul networks or any other backbone network.

The packet network 106 may be any local area network (LAN), wide-area network (WAN), or other data network that at least uses packet switching techniques (in addition to or instead of circuit switching techniques), in order to provide wide-scale data connectivity. For example, the packet network 106 may be an Internet Protocol (IP) network.

The gateway 104 and gateway 108 may be network points that perform as entrances to the packet network 106. The gateways 104, 108 may be IP telephony gateways or other network components that have packet switching capabilities. The gateway 104 and 108 may have many components including, but not limited to, processors, echo cancellers, amplifiers, switches, multiplexers, demultiplexers, or other components. In addition, the gateways 104, 108 may be manufactured on an analog line card, directly connected to the analog two-wire subscriber line. Of course, it is possible to condense gateway 108, network 110 and phone 118 all into a single network element, such as a SIP Phone or other packet-based telephone that has a packet interface, hybrid, analog speaker, and microphone all contained in the same physical unit.

The system 100 allows entities coupled to the networks 102, 110 to communicate with each other. For example, FIG. 1 illustrates a telephone 116 connected to network 102 and a telephone 118 connected to network 110. A user of the telephone 116 may communicate with a user of the telephone 118 through the system 100.

In operation, the system 100 may operate bi-directionally. A user of the telephone 116 may contact and communicate with a user of the telephone 118, or a user of the telephone 118 may contact and communicate with a user of the telephone 116 through the system 100. The networks 102, 110 and gateways 104, 108 may comprise similar components, thus the following example can be applied for communications in either direction.

As an example, the user of the telephone 116 may wish to contact and communicate with a user of the telephone 118. The user of telephone 116 may speak into a microphone of the telephone 116, which sends this analog speech signal to the network 102 along a two-wire circuit 120. The network 102 may include a subscriber line interface card (SLIC). The SLIC is an interface between the two-wire circuit 120 and the network 102, which typically employs four-wire circuits.

Two-wire circuits or local loops are used to connect homes and many businesses to the local telephone exchange, while four-wire circuits or trunks are used to connect the local telephone exchange to long-distance networks, mobile telephone networks, and packet networks. The SLIC splits the two-wire circuit 120 into two separate transmission links.

The network 102 may receive the analog speech signal from the telephone 116 and sample the analog speech signal at 8 KHz to produce 8-bit codewords. The network 102 may include an analog to digital converter (A/D converter) to sample the analog speech signal. The network 102 may output these codewords to the gateway 104 at a transmission rate of 64 Kbps (i.e., DS0-64 K). FIG. 1 illustrates one channel or connection (i.e., DS0-64) coupling the networks 102, 110 to the gateways 104, 108, and coupling the gateways 104, 108 to the IP network 106. However, more or fewer channels may be used, such as for instance, a T1 connection comprising DS1 signals, which include 24 DS0 (64 Kbps) signals transmitted using pulse-code modulation (PCM) and time-division multiplexing (TDM). The specific number of channels and the mode of transmission may vary among the numerous embodiments described herein.

The gateway 104, 108 may include a T1 (or T3, etc.) interface to de-multiplex the individual channels, and distribute the channels to appropriate call processing units. The gateway 104 may receive the 8-bit non-linear PCM samples from the network 102 and preferably convert these non-linear samples to linear format. That is, the network 102 (and network 110) may use a μ-law conversion or an A-law conversion (G.711 CODEC) of the analog signals from subscriber telephones 116 and 118 resulting in non-linear sample inputs. The gateway 104 may process these linear samples and then convert them back to a compressed format in order to send this information to the packet network 106. Any standard sample-based or frame-based audio codec can be used to encode the speech information in a transmission channel using an appropriate protocol. An example includes G.729A compression over Real-Time Protocol (RTP), UDP, IP, and Ethernet protocols to accomplish the packet transmission over packet network 106 to another endpoint, such as gateway 108, which in turn may process the signals in a manner similar to gateway 104. Gateway 108 transfers the decoded linear samples back to the appropriate format of network 110 via an appropriate interface (i.e. TDM trunk or similar to the couplings discussed above). The network 110 may then convert the codewords back to analog speech signals and route the analog speech signals to the telephone 118.

Network 110 may generate an echo of the analog speech signals sent to the telephone 118, due to the 4-wire to 2-wire circuit conversion (e.g., hybrid), wire gauge changes along the analog transmission path, or other considerations. The main cause of echo may be the SLIC or a similar device, since it is the interface between the 2-wire circuit and 4-wire circuit. The SLIC may not be able to perform the split of the 2-wire circuit into two separate signals perfectly, due to the physical realities of signal reflections occurring at any boundary with an impedance mismatch; therefore, some of the analog speech signals sent to the telephone 118 may be reflected back to gateway 108, thereby forming an echo signal. The network 110 may send these echo signals through the system 100 to telephone 116.

Echoes can also be generated by acoustical effects, such as feedback within certain types of handsets or hands-free telephones, particularly those used in digital cellular networks. A user of either of the telephones 116, 118 may hear echo when transferring signals through the system 100.

Most users of telephones within a system hear echo of their own voice. If the system contains as little as 30 milliseconds (ms) of round-trip delay the echo is acceptable. However, if the round-trip delay approaches 50 ms, virtually all users of telephones perceive unacceptable levels of echo if left uncontrolled. Delay of the echo signals may be introduced into the system 100 by transmission facilities and transmission equipment.

Some types of transmission equipment, such as the gateway 108, introduce delay into the system 100. Other transmission equipment can also introduce significant delays. Depending on the system 100 topology, and the type of transmission equipment used in the system 100, 30 ms of round-trip delay can occur in connections that are across a state or simply across a town. Of course, the most common source of delay in a circuit switched network is simply propagation delay associated with sending signals over a long distance telephone link. In a packet network, asynchronous transfer of data is the norm. Data is sent as a frame or packet of information that takes time to queue samples from a synchronous circuit switched interface into an audio frame, be processed and routed across a packet network to then be processed and "dejittered" to allow decoding and synchronous play-out by another synchronous interface.

The networks 102 and 110 of the system 100 typically provide either a 3 dB ERL (for local phone calls) or a 6 dB ERL (for long distance phone calls). However, other network conditions within and outside network 102, 110 may provide additional ERL. Typically, local phone connections may only provide 3 dB of ERL and network echo cancellers are normally not required during local calls because the round trip delay (echo path delay) is smaller than 30 ms, and the echo is hidden in the side tone of the analog telephone. However, within a typical long distance phone call, longer transmission delays are present, and in order to allow standard compliant echo cancellers to function properly, network 102, 106 will therefore provide at least a 6 dB ERL.

If an echo signal is generated at the receiving end 114, the network 110 sends the echo signal to the gateway 108. The gateway 108 preferably attempts to reduce and/or eliminate the echo signal using echo cancellers. However, if the gateway 108 does not eliminate the echo signal, the echo signal will be sent to the packet network 106 and subsequently to the telephone 116.

A primary purpose of the gateway is to control the echo of a speech signal. This can be accomplished by synthesizing a replica of the echo path impulse response and using it to generate an estimate of the echo, which can be subtracted from the actual circuit echo. The gateway may include an echo canceller, which estimates an echo signal by adapting to a channel's impulse response of system 100. Each time an echo signal is deemed to be present, the echo canceller attempts to cancel the echo by subtracting an echo estimate from the received signal. Based on the remaining signal, or error, the echo canceller adapts its echo estimate. In this way, the echo canceller adapts or changes its echo estimate over time.

When both telephones 116, 118 are communicating simultaneously (referred to as double-talk), the echo cancellers may continue to subtract the echo signals from the speech signals without distorting the speech signals. However, the echo canceller may need to determine when double-talk is occurring in order to disable adaptation of the echo canceller, because adapting to signals that are not echo signals will cause some level of divergence and, therefore guarantee that the filter does not match the impulse response of the echo path within the system 100. Networks 110 and 102 typically aid in allowing the echo canceller to operate properly by providing the minimum amount of ERL required for their operation (which according to industry standard is 6 dB). Known problems arise when the networks are not within ones direct control or distance preclude the ability to configure network 102, 110 to provide this minimum amount of ERL.

However, if less than a 6 dB difference in power levels exists, then the signals sent from the networks 102, 110 to the gateways 104, 108 may not allow a desired amount of robust echo canceller adaptation and performance. For example, convergence rates are inversely proportional to ERL. So as ERL gets larger, the convergence rate (time to converge) gets smaller. Therefore, robust echo canceller performance is a function of ERL and the ability to provide more ERL to the canceller by providing apparent ERL may possibly enhance convergence rates and overall echo canceller performance.

Unfortunately, however, not all networks, such as networks 102 and 110 illustrated in the prior art system 100 may be designed or configured to ensure a 6 dB ERL or a sufficient amount of ERL, so that all echo signals will be attenuated a sufficient amount to allow the desired performance of the echo canceller. Therefore, the echo canceller left on its own, may adapt insufficiently or not at all.

In an exemplary embodiment, the gateways 104 and 108 may trigger adaptation of standard echo cancellers when an ERL provided by the networks 102 and 110 on an echo signal is less than 6 dB or less than a standard amount. By permitting the echo cancellers to adapt to higher power echo signals, the requirement of the networks 102 and 110 to provide a standard amount of ERL is lessened. Allowing the network echo cancellers to adapt in the presence of higher power echo signals may result in an increased incidence of echo canceller adaptation occurring during a double-talk scenario, however, the inventor has discovered that performance is not seriously degraded. Furthermore, the use of echo cancellers capable of recovering from a divergence condition may further reduce any degradation. The gateway 104 and 108 may lower the amount of required ERL to be provided by the networks 102 and 110 by providing an apparent ERL themselves. For example, the gateways 104 and 108 may provide at least a portion of the total ERL, referenced by the echo canceller algorithm.

Figure 2:
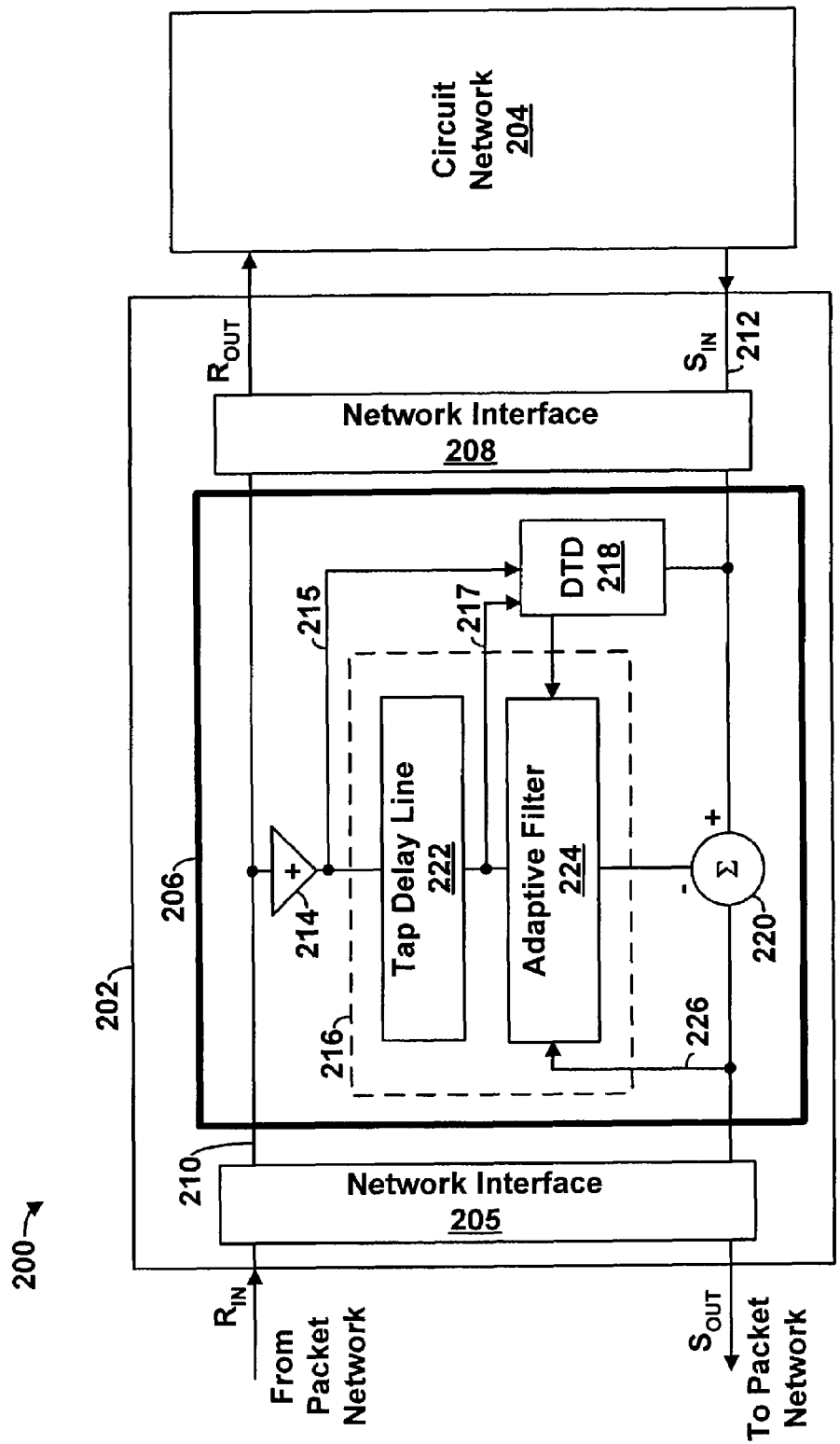
FIG. 2 is a block diagram illustrating one embodiment of a gateway.

FIG. 2 is a block diagram illustrating one embodiment of a transmitting and/or receiving end 200 of a system similar to the transmitting and receiving ends 112, 114 of system 100, in which gateway 200 may trigger adaptation of echo signals when an ERL provided by network 204 of an echo signal is less than 6 dB. The end of the system 200 comprises the gateway 202 coupled to the network 204.

The gateway 202 may include a packet network interface 205 coupled to a processing unit 206, which is also coupled to another network interface 208. A receive input ($R_{IN}$) signal path 210 transfers signals from the packet network through the network interfaces 205, 208 to the processing unit 206. Similarly, a send input ($S_{IN}$) signal path 212 transfers signals from the network 204 through the network interfaces 205, 208 to the processing unit 206. The processing unit 206 comprises an amplification means 214 coupled to an echo canceller 216 and a double talk detector (DTD) 218. The DTD 218 is also connected to the output of the amplification means 214 and the send input ($S_{IN}$) signal path 212. The echo canceller 216 connects to a summation device 220, which is coupled to the output signal path 210. The echo canceller 216 comprises a tap delay line 222 coupled to an adaptive filter 224. The echo canceller 216 may also include other components (not illustrated) such as a convolution processor, a subtractor, a nonlinear processor (for noise and echo suppression), and comfort noise insertion (to fill in the wanted background noise that was removed). An output of the summation device 220 is an error signal 226, which is coupled to the adaptive filter 224.

The gateway 202 may include other dynamic components to monitor the level of ERL present and dynamically update appropriate parameters in order to enhance the total amount of ERL seen by the canceller. For example, signals on ($R_{OUT}$) may be measured and compared to signals received and measured on ($S_{IN}$) during single talk conditions and may be included within the gateway 202 in order to adjust the amplification means 214 to amplify (increase in magnitude) the signals received on the ($R_{IN}$) signal path 210 and sent to the echo canceller's delay line. 222. By doing this, the amount of apparent ERL can be variable. Any of the components of the gateway 202 can take various forms and additionally, functions of these components (or the components themselves) can be combined if desired. For example, the DTD 218 or summer 220 may be incorporated within the echo canceller 216.

Signals ($R_{IN}$) are received into the gateway 202 along the input signal path 210 from a packet network. The input signal path 210 sends the $R_{IN}$ signals to the amplification means 214. The input signal path 210 also sends the $R_{IN}$ signals out of the gateway 202 to the network 204. The signals output from the gateway 202 are referred to as Receive-out or $R_{OUT}$. The output signal path 212 receives signals from the network 204 and sends these signals to the IP network. The signals received from the network 204 were sent from a telephone and as such, these signals are referred to as Send-in or $S_{IN}$. Signals sent out of the gateway 202 along the output signal path 212 are referred to as Sent-out signals or $S_{OUT}$.

The amplification means 214 may include circuitry that performs functions of an amplifier. The amplification means 214 may be a variable gain amplifier, which may be set to amplify a signal's power level to a desired extent, so as to produce output amplified signals. For example, the amplification means 214 may be provided between 0 dB and some larger appropriate value. Certainly 0 to 6 dB is appropriate, but larger values can be implemented successfully up to 20 dB. However, other examples are possible as well. For example, the amplification means 214 may be implemented in numerous ways, including but not limited to, a bit shifting register to amplify digital signals.

The gateway 202 transforms digital signals to a standard linear PCM format such that echo canceller 216 receives amplified signals from the amplification means 214 and transforms the signals into linear PCM codewords. (Alternatively, the digital-digital conversion of the signals may be performed within the network interface 205 or prior to signals entering gateway 202). The echo canceller inputs the linear PCM codewords into the tap delay line 222. The tap delay line 222 may be a register that has slots that each hold a 16-bit codeword. The tap delay line 222 is connected to the adaptive filter 224. The adaptive filter 224 may comprise a finite impulse response (FIR) filter, which operates based on the well-known least square optimization solutions. The adaptive filter 224 may comprise multipliers that are programmed with coefficients. Each slot of the register of the tap delay line 222 connects to a multiplier within the adaptive filter 224. The multipliers multiply each of the 16-bit codewords by a coefficient in order to produce a mathematical representation of an echo signal. The resulting products are added and an estimate of the echo estimate is produced. The estimate of the echo signal is fed to the summation device 220. The adaptive filter 224 may alter or modify its coefficients to adjust to the echo signals from the network 204. Alternatively, the tap delay line 222 may perform as a memory buffer and the filtering may be accomplished via processing by a microprocessor.

The echo canceller 216 produces an estimate of the echo channel's impulse response of the network 204. The echo signals from the network 204 can be accurately predicted once the network's impulse response is accurately estimated. Since speech signals consist of many different frequency components spread over varied periods of time, the impulse response of the network 204 must be learned. Once the impulse response is accurately represented by the adaptive filter 224, the multiplication of its coefficients (the impulse response model) with the input speech signals will produce an accurate estimate of the echo signal produced by network 204.

The DTD 218 is used to determine when the $S_{IN}$ signals on the output signal path 212 comprise speech signals or simply echo signals. The DTD 218 may be any measuring device that can compare power levels, measure residual echo, and/or detect for divergence, such as a microprocessor operating on sampled data. The DTD 218 may receive signals from amp 214 on line 215 or alternatively from tap delay line 222 on line 217.

The summation device 220 may be any summer or subtractor and may comprise, for example, a microprocessor or processing means. The summation device 220 may also comprise logic that may perform addition and subtraction functions.

In operation, the system 200 may receive a codeword speech signal from the IP network. The speech signal may be input to the gateway 202 along the input signal path 210. The amplification means 214 may receive the speech signal from the input signal path 210 and amplify the signal by 3 dB. For example, the amplification means 214 may comprise a register, which inputs the codewords. The amplification means 214 may amplify a magnitude of the codewords by bit-shifting the codewords to the left. Conversely, the amplification means 214 may comprise an operational amplifier (op-amp) used to amplify the power level of the speech signal received along the input signal path 210 in embodiments of the gateway that provide an analog interface. The amplification means 214 may send the amplified codewords to the echo canceller 216 and to the DTD 218. The echo canceller 216 may input the amplified codewords into the tap delay line 222, which individually sends the codewords to the adaptive filter 224. The adaptive filter 224 may multiply the codewords by pre-learned coefficients so as to produce an estimate of an echo signal. The estimate of the echo signal is output to the summation device 220. The summation device 220 also receives the $S_{IN}$ signals along the output signal path 212. The summation device may subtract the estimated echo signal from the received signal. In this manner, any echo signal within the received signal may be cancelled.

The summation device 220 also outputs an error signal 226, which is sent to the adaptive filter 224 of the echo canceller 216. The error signal 226 indicates to the adaptive filter 224 an amount of modifications necessary to the coefficients in order to more effectively model an echo signal. The error signal 226 allows the adaptive filter 224 to adapt to the network line conditions that produce the error signal. Since not all networks are equivalent, the adaptive filter 224 can adapt to the conditions of a specific network using the error signal 226. The error signal 226 may be sent to the adaptive filter 224 in a feedback loop in order to adjust the adaptive filter's 224 coefficients so as to minimize the error signal 226. The process of determining the set of optimal filter taps that minimize the error signal 226 is referred to as convergence. It may be desirable for the adaptive filter 224 to maintain a minimal error signal 226 and thus achieve a continuously high level of echo cancellation thereby achieving convergence.

The DTD 218 may also receive the $S_{IN}$ signals along the output signal path 212. The DTD 218 may compare the power levels of the $S_{IN}$ signals with the power levels of the amplified signals received from the amplification means 214. In simplified terms, if the DTD 218 determines that the difference in power levels is 6 dB or more, then the $S_{IN}$ signals received along path 212 are treated as if they were only echo signals. However, if the difference in power levels is less than 6 dB, then the $S_{IN}$ signals received along the output signal path 212 might be considered double-talk (e.g., $R_{IN}$ and $S_{IN}$ both contain speech signals).

The DTD 218 may be coupled to the adaptive filter 224 in order to trigger adaptation of the adaptive filter 224. Adaptation is performed in response to the DTD's 218 trigger, and is based upon the error signal 226 from the summation device 220. Adaptation is the process of updating the model of the echo channel impulse response of the network 204. If the DTD 218 detects an insufficient power level difference between the $S_{IN}$ and amplified signals, then the DTD 218 may send a signal to the adaptive filter 224 indicating that the adaptive filter 224 should not adapt to the present signals since they contain speech signals. However, if the DTD 218 detects a sufficient power level difference, then the DTD 218 may send a signal to the adaptive filter 224 indicating that the adaptive filter 224 should adapt to the present signals. The signals sent from the DTD 218 to the adaptive filter 224 either inform the adaptive filter 224 to ignore the error signal 226 from the summation device 220, causing the coefficients of the adaptive filter 224 to remain the same, or inform the adaptive filter 224 to adjust its coefficients in a manner which minimizes the error signal 226.

Because speech signals can distort the error signal 226 and confuse the adaptation process, adaptation is halted when the DTD 218 detects a speech signal. The echo canceller 216, however, still continues to cancel (i.e., subtract) echo signals during double-talk. As soon as the DTD 218 senses that double-talk is no longer present, it signals the adaptive filter 224 to, once again, use the error signal 226 to adapt the coefficients to the impulse response of the network 204.

If the adaptive filter 224 were allowed to adapt while both callers are talking, the error signal 226 would become very large, and the impulse response model would be erroneously adjusted. Mis-adjustment of the impulse response model, referred to as divergence, can result in clear or distorted echo.

In either case, whether the adaptive filter 224 is adapting or not, the adaptive filter 224 may output an estimation of an echo signal in order to cancel any echo signals present in the $S_{IN}$ signals along the output signal path 212. The DTD 218 may perform as a switch or triggering mechanism that determines when the adaptive filter 224 may adjust its coefficients to better model the echo signals of the network 204.

Employing the amplification means 214 within the gateway 202 effectively provides an apparent ERL since it allows for a smaller ERL to be present within the network 204. The DTD 218 can compare the power levels of the amplified signals output from the amplification means 214 to the $S_{IN}$ signals along the output signal path 212 instead of comparing power levels of the $R_{IN}$ signals to power levels of the $S_{IN}$ signals. The amplified signals may have more power than any echo signal along the ($S_{IN}$) signal path 212. For example, suppose a normal speech signal, that has a relative power level of 0 dB, is input along the input signal path 210 as an $R_{IN}$ signal. The amplification means 214 may amplify this signal by a necessary amount (e.g., 3 dB) so as to produce a speech signal that has a power level 3 dB less than that seen by DTD 218. The unamplified speech signal is sent to the network 204, which may generate an echo replica signal. The network 204 will provide an ERL (i.e. 3 dB), so that the $S_{IN}$ signal along the signal path 212 has a power level of −3 dB less than ($R_{OUT}$). The DTD 218 may compare the 3 dB power level of the amplified signal output from the amplification means 214 to the −3 dB power level of the $S_{IN}$ signal along the output signal path and determine that a 6 dB difference in power exists. If this minimum difference is found to exist, the echo canceller can engage adaptation of its adaptive filter and maintain its design criteria of rapid convergence, subjective low returned echo levels during single talk, and low divergence during double talk.

In practice, FIG. 2 shows that $R_{IN}$ will be equal to $R_{OUT}$ while the canceller sees the output of the gain block 214 as the input to its Tap Delay Line 222. Because ERL is defined as $R_{OUT}$ minus $S_{IN}$, when ERL is small (i.e., less than 6 dB) $S_{IN}$ and $R_{OUT}$ will be relatively close in power level and the typical echo canceller written according to current industry standards will not be able to quickly and efficiently adapt during this condition (i.e. adaptation will freeze) and echo performance certainly may be degraded. However, in an exemplary embodiment of the present invention, the gain block 214 will apply a reference signal to the echo canceller that is actually larger in signal amplitude than was sent to $R_{OUT}$. As a result, the DTD 218 will sense an ERL of $R_{OUT}$ minus $S_{IN}$ plus Gain 214. This total ERL as seen by the echo canceller is Echo Return Loss Enhancement (ERLE), as shown in equation 1 below.

$$ERLE = ERL + Gain \qquad (Eq. 1)$$

As an example, if $R_{OUT}$ is −10 dBm0, $S_{IN}$ is −13 dBm0, and the gain 214 is +3 dB, then ERLE =(−10)dBm0−(−13) dBm0+(+3)dB=6 dB. ERLE can be used to create the appropriate conditions for robust rapid convergence, low returned echo levels during single talk and low divergence during double talk.

The amplification means 214 may be a variable amplification means 214 and may be adjusted according to sensed (measured) line conditions. For example, if the network 204 echo path is providing a 3 dB ERL, then the amplification means 210 may be set to 3 dB in order to produce a 6 dB power level difference that is needed to trigger adaptation. However, if the network 204 echo path provides more than a 3 dB ERL, then less than a 3 dB amplification can be instituted in order to meet the 6 dB power level difference. So, one benefit of this is that when ERLs are already large (e.g., 18 dB) the gain block can be set to 0 dB. However, when the ERL is small (e.g., 1 dB) this gain block 214 can be set higher (e.g., 5 dB, 7 dB, 12 dB or greater as appropriate). Performance tuning is possible such that by measuring the external echo path, the internal enhancement applied at the echo canceller's interfaces can be adjusted for optimum performance.

The DTD 218 may also adjust the amplification means 214 to amplify signals received along the input signal path 210 according to line conditions or conditions of the network 204. Also, a network operator may configure the amplification means 210 through the network interface 205. In one example, the DTD 218 may compare power level of the signal sent to $R_{OUT}$ with power level of $S_{IN}$ signals, when no double-talk is present, in order to determine and measure the "actual" ERL provided by the network 204. For instance, if an $R_{OUT}$ signal has a power level of −10 dBm0 and the $S_{IN}$ echo signal has a power level of −13.5 dBm0, then the network 204 echo path provides an ERL of 3.5 dB. The DTD 218 can set the amplification means 214 to at least 2.5 dB and the canceller will function as if the ERL provided by the network were 6 dB or greater. The DTD 218 can set the amplification means 214 to any amount based on the measured actual ERL.

The amplification means 214 may prevent the DTD 218 from detecting some double-talk situations, which would result in adjusting the adaptive filter 224 at undesirable times, resulting in divergence of the adaptive filter 224. This is due to the amplification means 214 providing an initial amplification of an $R_{IN}$, but not amplifying $R_{OUT}$ and having the echo canceller and DTD 218 compare this amplified signal to an $S_{IN}$ signal along signal path 212. In a prior art device, a power level of an $R_{IN}$ input signal would be compared to a power level of an $S_{IN}$ signal along signal path 212, so if the $R_{IN}$ signal was speech with a power level of −20 dBm0 and the $S_{IN}$ signal along signal path 212 was speech having a power level of −25 dBm0 (a difference of 5 dB), then the DTD 218 would recognize double-talk and disable adaptation of the adaptive filter 224. However, in the exemplary embodiment described herein, using the amplification means 214, the $R_{IN}$ input signal would be amplified by 3 dB (resulting in a signal with a power level of −17 dBm0), and when compared to the −25 dBm0 speech signal at $S_{IN}$ along signal path 212, the DTD 218 would determine an 8 dB power level difference and certainly could trigger adaptation of the adaptive filter 224. Because this condition is really double talk, the reference signal in the tap delay line will not correlate to signal being received at $S_{IN}$, therefore, a small amount of divergence may occur before double-talk is actually detected.

The use of an erroneous error signal will cause the filter to diverge. One technique that may be used to recover from divergence is to store filter coefficients in a memory buffer and to reload the stored coefficients when divergence is detected. Such a technique is described within commonly owned U.S. patent application Ser. No. 09/322,512, filed on May 28, 1999, the full disclosure of which is incorporated herein by reference. Therefore sufficient methods may be employed to enhance a canceller's ability to detect this situation and recover from it (i.e. freeze adaptation before the echo path estimate has been destroyed, use dynamic values of the adaptation constant to enhance fast convergence and slow divergence [Track mode], or revert back to previously known taps, etc.). One weakness of this embodiment is that gain in the system will always present the possibility of clipping of the signal input into the tap delay line 222. If this occurs, non-linearities will be introduced into the adaptive filter because this clipping with not be present in the actual echo path $S_{IN}$; therefore, an analysis of actual signals and the amount of gain required must be studied for each specific network deployment because other embodiments may be preferred if very large signal powers need to be supported. (see specific examples below). On the other hand, it may be preferable to other alternatives because no signal change is introduced to any network interfaces such that the terminating end-point signal strength is unaffected.

Figure 3:
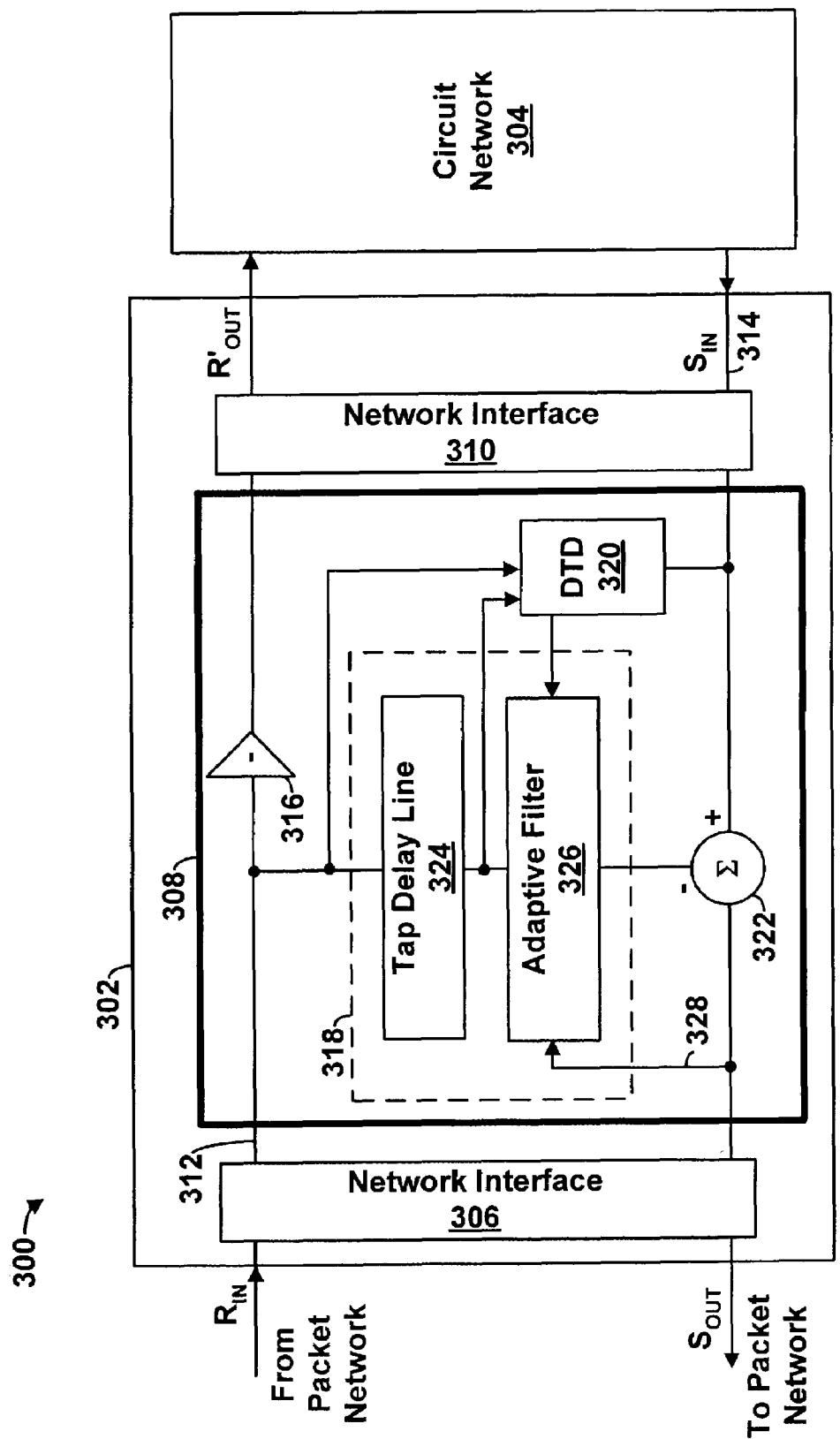
FIG. 3 is a block diagram illustrating another embodiment of a gateway.

FIG. 3 is a block diagram illustrating another embodiment of a transmitting and/or receiving end 300 of a system similar to the transmitting and receiving end 200, in which gateway 302 may trigger adaptation of echo signals when an ERL provided by network 304 of an echo signal is less than 6 dB because the gateway 302 provides an apparent ERL. The end of the system 300 comprises the gateway 302 coupled to the network 304.

The gateway may include a network interface 306 coupled to a processing unit 308, which is coupled to another network interface 310. An input signal path 312 transfers signals from the IP network through the network interfaces 306, 310 and the processing unit 308 to the network 304. Similarly, an output signal path 314 transfers signals from the network 304 through the network interfaces 310, 306 and the processing unit 308 to the IP network. The processing unit 308 comprises an attenuation means 316 (negative gain module) coupled to the $R_{IN}$ input signal path 312. An output of the attenuation means 316 is coupled to the network interface 310. The processing unit 308 also comprises an echo canceller 318 and a DTD 320 coupled to the $R_{IN}$ signal path 312 and $S_{IN}$ signal path 314. The echo canceller is operating in a industry standard fashion and is coupled to the $S_{IN}$ signal path 314. The echo canceller includes a tap delay line 324 coupled to an adaptive filter 326An error signal 328 is output from the summation device 322 and is sent to adaptive filter 326. There are other modules that may comprise an echo canceller and are not shown since they do not relate directly to the invention; however, it is important that any non-linear processing and comfort noise insertion work in harmony with the rest of this system.

The gateway 302 may operate similarly to gateway 202. However, gateway 302 has an attenuation means 316 within its input signal path 312. The attenuation means 316 may provide signal attenuation after the $R_{IN}$ signal has been fed to the echo canceller's tap delay line 324. This will create an apparent ERL on signals sent along the $R'_{OUT}$ signal path 312. ERLE, as viewed by the echo canceller 308, will be the apparent ERL attributed to the attenuation means 316 plus the echo path ERL $R'_{OUT}$ minus $S_{IN}$. The gateway 302 may receive an $R_{IN}$ signal from the IP network along the input signal path 312 and forward the $R_{IN}$ signal to the echo canceller 318 and DTD 320. Rather than forwarding the $R_{IN}$ signal received speech signal to the network 304, the $R_{IN}$ signal is then attenuated by the attenuation means 316 so as to produce an $R'_{OUT}$ signal, which is then sent to the network 304.

The attenuation means 316 reduces the magnitude of the $R_{IN}$ signal or attenuates the $R_{IN}$ signal to a lower power level. For example, if a signal that had a −10 dBm0 power level was received along the $R_{IN}$ signal path 312 and then attenuated by 3 dB by the attenuation means 316, the $R'_{OUT}$ signal would have a power level of −13 dBm0. The attenuation means 316 may include circuitry that can reduce the magnitude of a signal. The attenuation means 316 may be a variable attenuator, which may be set to attenuate a predetermined amount of a signal's power level. The attenuation means 316 may also be a bit shifting register, such that a right bit shift attenuates a digital signal. The system 302 provides the attenuation means 316 a linear PCM signal. All coding/transcoding can be covered elsewhere within the system 302.

In operation, the gateway 302 provides an apparent ERL on $R_{IN}$ signals. In this manner, the DTD 320 compares $R_{IN}$ signals to $S_{IN}$ signals that have been attenuated by the attenuation means 316 and subsequently by the echo path of network 304 in order to determine whether to trigger adaptation of the adaptive filter 326. For example, suppose an $R_{IN}$ signal having a power level of −10 dBm0 was sent to gateway 302. The $R_{IN}$ signal is transferred to the attenuation means 316 with a setting of (−3 dB) that would generate signal $R'_{OUT}$ having a power level of −13 dBm0. The network may provide an ERL of 3 dB, such that any echo signals received at the gateway302 $S_{IN}$ interface would have an approximate power level of −16 dBm0. To the echo canceller, the echo return loss equals the apparent ERL plus the network 304 ERL or 6 dB in this case. The DTD 320 can compare a power level of the $R_{IN}$ signal (−16 dBm0) to a power level of the $S_{IN}$ signal (−10 dBm0) to determine if adaptation is proper. In this example, a 6 dB power level difference exists, therefore, the DTD 320 may send a signal to the adaptive filter 326 indicating that adaptation is proper.

One advantage of this embodiment is that it removes the possibility of signal clipping. So, for environments with large signal power, this embodiment may be preferred over the embodiment with an amplification means. However, in environments with low signal power, more attenuation of the received signals at the terminating end-points in network 304, may be undesirable.

Figure 4:
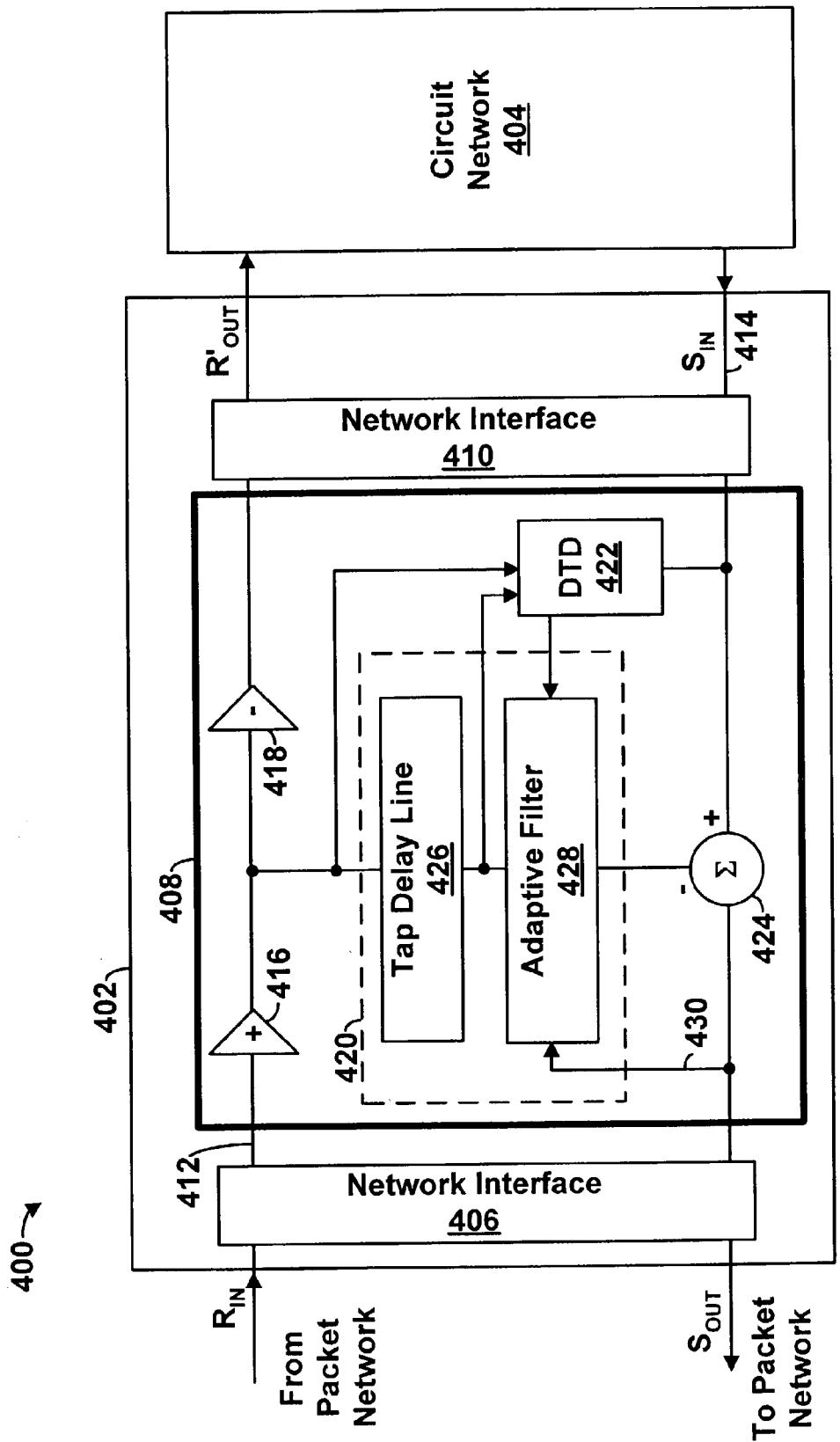
FIG. 4 is a block diagram illustrating another embodiment of a gateway.

FIG. 4 is a block diagram illustrating another embodiment of a transmitting and/or receiving end 400 of a system similar to the transmitting and receiving end 200, in which gateway 402 may trigger adaptation of echo signals when an ERL provided by network 404 of an echo signal is less than 6 dB, or less than a desired amount because the gateway 402 provides an apparent ERL. The end of the system 400 comprises the gateway 402 coupled to the network 404.

The gateway 402 may include components similar to gateway 202, 302, such as for example, an input signal path 412 coupled to an amplification means 416, which connects to an attenuation means 418. An output of the amplification means 416 also connects to an echo canceller 420 and a DTD 422. The DTD 422 is connected to an output signal path 414, which connects to a summation device 424 that is also coupled to the echo canceller 420. The echo canceller 420 comprises a tap delay line 426 coupled to an adaptive filter 428. An output of the summation device 424 is an error signal 430, which is coupled to the adaptive filter 428.

The gateway 402 may operate similarly to gateway 202. However, gateway 402 has both an amplification means 416 as well as an attenuation means 418 within its $R_{IN}$ signal path 412. The gateway 402 may receive an $R_{IN}$ speech signal from the IP network along the input signal path 412. Rather than forwarding the received speech signal to the network 404, the signal may be amplified and sent to the echo canceller's tap delay line 426 and DTD 422. The amplification and subsequent processing of the signal may be similar to that described in relation to the gateway 202. However, before sending the amplified signal to the network 404, the amplified signal is sent to the attenuation means 416, which reduces the magnitude of the amplified signal. When the amplification means 416 and the attenuation means share the same value, $R_{IN}$ and $R'_{OUT}$ will be equal. However, any desired combination is possible given any specific sensitivities of a particular canceller or desired goals such as optimal performance or minimal signal clipping. For example, an $R_{IN}$ signal of −10 dBm0 received along signal path 406 and then amplified 3 dB by the amplification means 416, would then be sent into the echo canceller's tap delay line 426 at a power level of −7 dBm0. Then the signal, as amplified, would be sent to the attenuation means 418. If this attenuation means 418 were set to (−3 dB), then the amplified signal would be returned to a level of −10 dBm0 and sent as $R'_{OUT}$.

In operation, the gateway 402 does not alter $R_{IN}$ signals received along the input signal path 412 as compared to $R'_{OUT}$ signals sent to the network 404 resulting in no net gain through the gateway. To the external interfaces (signals entering and leaving network interface 406 and 410), it can be realized that no signal change has taken place. However, there may be reasons outside the scope of this invention itself (network signal specifics/power levels/ERLs) that may require the attenuation means 418 to be different from the amplification means 416. The gateway 402 initially amplifies received signals, and attenuates them back to their original values. In this manner, the DTD 422 compares an amplified version of $R_{IN}$ to an $S_{IN}$ signal received along signal path 414 when determining whether to trigger adaptation of the adaptive filter 428.

Gateways 202, 302, and 402 each reduce ERL requirements of the networks 204, 304, and 404 since the networks 204, 304, and 404 only need to provide a minimal amount of ERL (1 dB to 6 dB) according to the examples presented herein. The gateways 202, 302, and 402 provide various signal processing, thus providing apparent ERLs as small as 0 dB or as large as necessary (3 dB, 6 dB . . . etc.) to meet the desired performance objectives. Again, automatic detection of network ERL can be utilized to dynamically change the apparent ERL being provided and deliver optimal echo canceller performance or any desired level of echo return loss needed to meet specific objectives possibly on a per circuit, per call basis.

Since the input signal paths 210, 312, and 412 receive $R_{IN}$ signals from an packet network and sends these signals to the networks 204, 304, and 404 as well as the output signal paths 212, 314, and 414; receives signals from the networks 205, 304, and 404; and sends $S_{OUT}$ signals to the packet network, the gateways 202, 302, and 402 operate bi-directionally. As an example, referring back to the system 100 illustrated in FIG. 1, gateway 104 receives signals from the IP network 106 along an input signal path (as illustrated by an arrow pointing to the gateway 104 on the line connecting the gateway 104 and IP network 106) and sends signals to the IP network 106 along an output signal path (illustrated by an arrow pointing to the IP network 106 on the line connecting the gateway 104 and the IP network 106).

Figure 5:
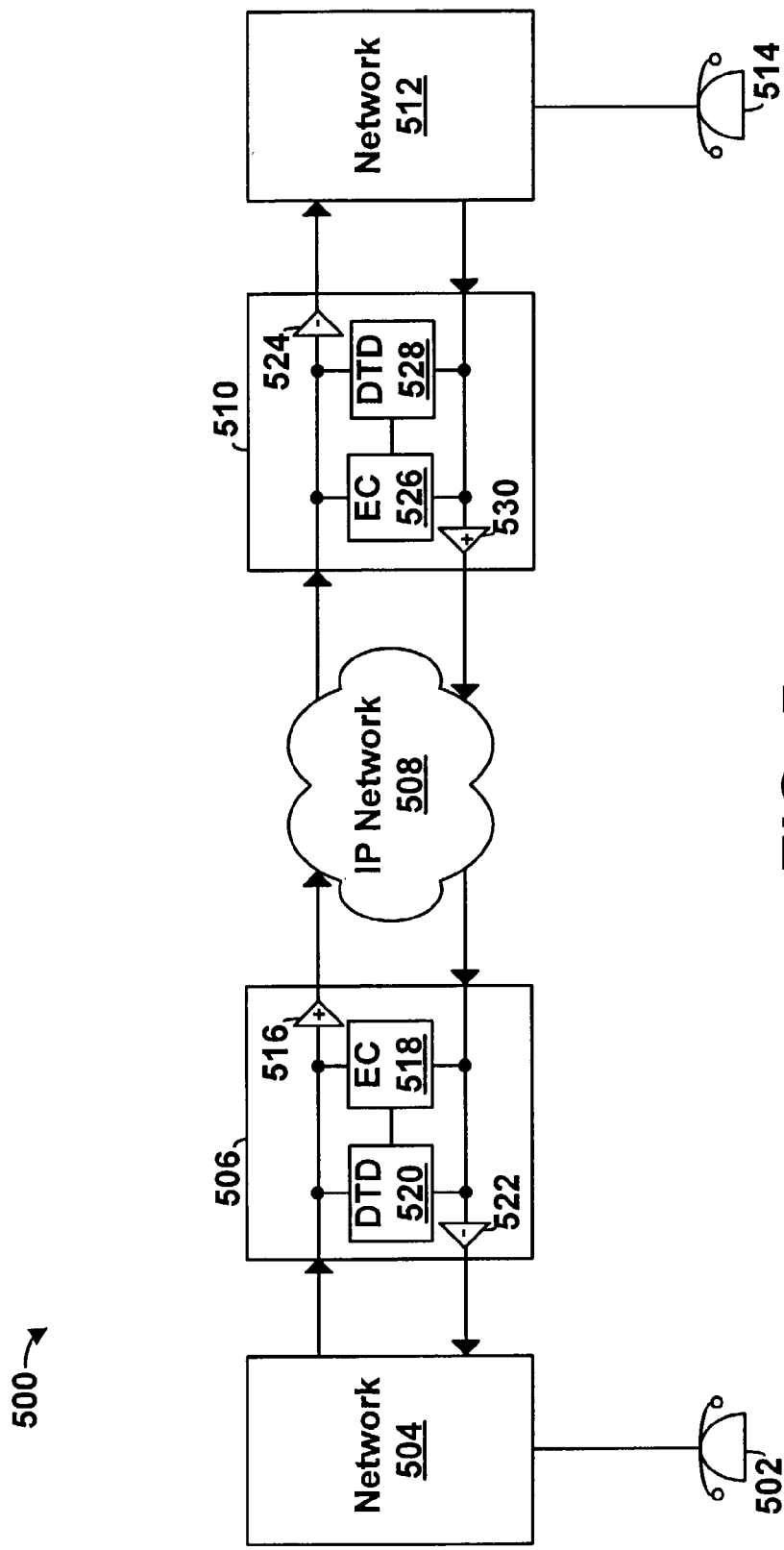
FIG. 5 is a block diagram illustrating another embodiment of a system.

FIG. 5 is a block diagram illustrating another embodiment of a system 500. The system 500 may be similar to system 100 illustrated in FIG. 1. System 500 illustrates operation of gateways similar to gateway 402. System 500 may include a telephone 502, or other communication device, connected to network 504, which is connected to a gateway 506. The gateway 506 is connected to the IP network 508, which is connected to a gateway 510 (or other packet terminating device, such as a SIP User Agent or the like). The gateway 510 may be connected to a network 512, which connects to a telephone 514.

The gateways 506 and 510 may be similar to gateway 402 illustrated in FIG. 4. Gateway 506 has an amplification means 516, the input of which is coupled to an echo canceller (EC) 518 and a DTD 520. The EC 518 and the DTD 520 are also coupled to the input of an attenuation means 522. Similarly, gateway 510 includes an attenuation means 524, the input of which is coupled to an EC 526 and a DTD 528. The EC 526 and the DTD 528 are also coupled to an input of an amplification means 530.

As an example, gateway 506 may receive a speech signal from the network 504, which received the signal from the telephone 502. The gateway 506 may amplify the signal using the amplification means 516 and send the signal to the gateway 510 through the IP network 508. The EC 526 and DTD 528 of the gateway 510 may receive the amplified signal and use it to determine if the EC 526 should adapt or not. The amplified signal is then sent to the attenuation means 524, which reduces the magnitude of the signal to its original amount and sends the signal to the network 512. The network may generate an echo signal and/or the telephone 514 may send a signal to the network 512. The echo signal (if generated) and/or the speech signal from the telephone 514 may be sent from the network 512 to the gateway 510. The DTD 528 may compare the $S_{IN}$ signal sent to the gateway 510 from the circuit network 512 with the $R_{IN}$ signal sent to the attenuation means 524, this in part, determines if adaptation should occur. The signal received at the gateway 510 from the circuit network 512 is then amplified by the amplification means 530 and sent to the gateway 506 through the IP network 508. The gateway 506 may receive this signal and process it in a similar manner as described in relation to signal processing within gateway 510.

The system 500 illustrates that each gateway in the system 500 may contain both an amplification means and an attenuation means. However, unlike gateway 402 in FIG. 4, only one of the amplification means or the attenuation means is within a signal path of a particular gateway. For instance, the circuit to packet (input) signal paths (i.e., the path the gateway sends signals to the packet networks) contains an amplification means and the packet to circuit signal paths (i.e., the path the gateway sends signals to the circuit networks) contains the attenuation means. Conversely, gateway 402 includes both an amplification means 416 as well as an attenuation means 418 within the same circuit to packet (input) signal path 412. One advantage here is to provide gain only in the digital domain of the packet network, allowing for attenuation again before these signals reach the circuit switched network. Therefore, it is possible to create transmission level points to increase or decrease signal magnitude (or provide unity) as referenced by any network element, and it is also possible that echo canceller performance can be enhanced for circuits that could use some amount of apparent ERL.

Figure 6:
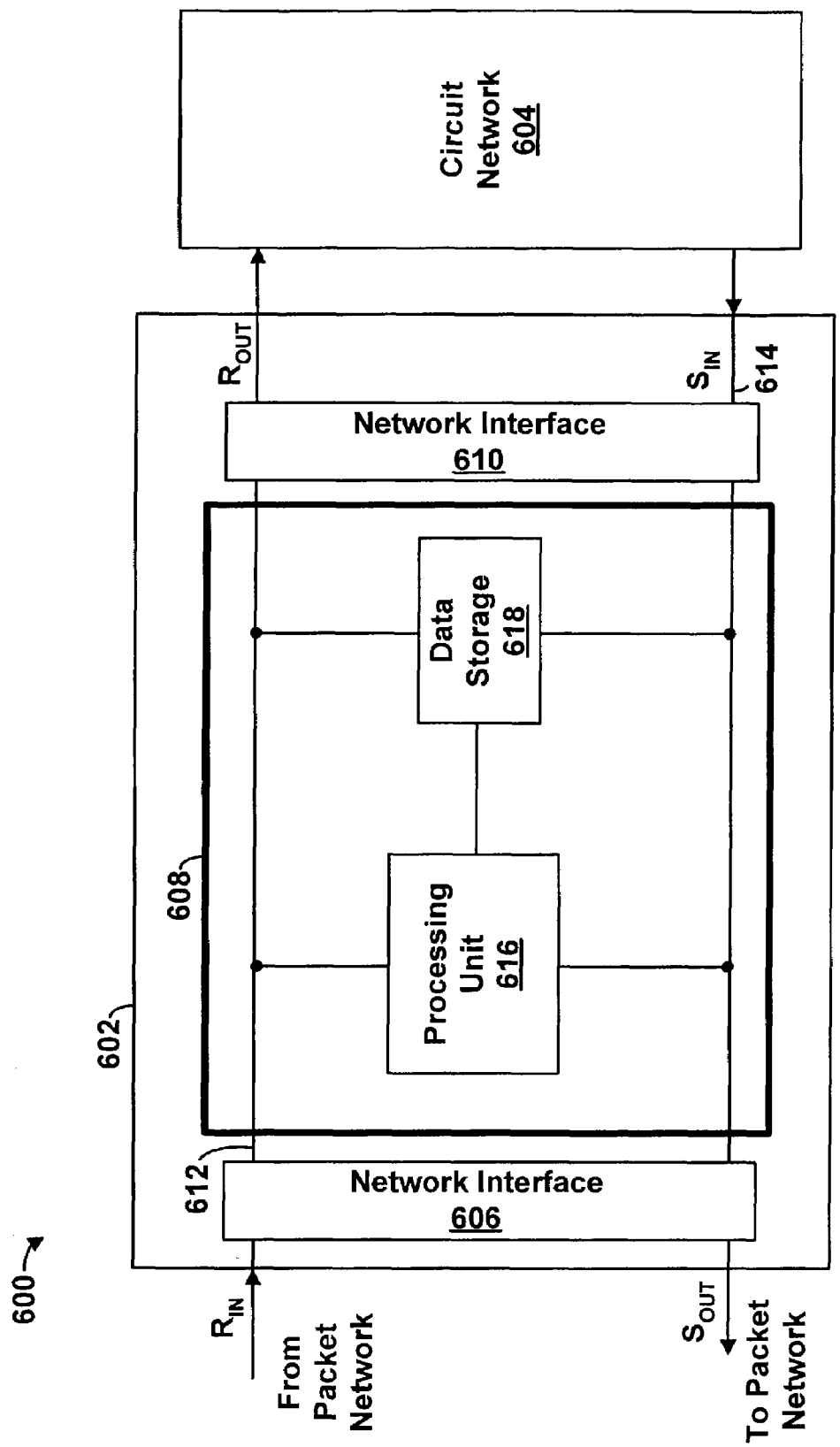
FIG. 6 is a block diagram illustrating another embodiment of a gateway.

FIG. 6 is a block diagram illustrating another embodiment of a system 600. The system 600 may include a gateway 602 coupled to a network 604. The gateway 602 may include an a network interface 606 coupled to a call processing unit 608, which is coupled to another network interface 610. An $R_{IN}$ (input) signal path 612 transfers signals from the packet network through the network interfaces 606, 610 and the call processing unit 608 to the network 604. An $S_{IN}$ signal path 614 transfers signals from the network 604 through the network interfaces 610, 606 and the call processing unit 608 to the IP network. The call processing unit 608 comprises a processing unit 616 and data storage 618, each of which are coupled to the input signal path 612 and the output signal path 614.

The processing unit 616 may be a commercially available micro processor, Digital Signal Processor, or ASIC that may operate according to an operating system, which may be any suitable commercially available embedded or disk-based operating system, or any proprietary operating system. The processing unit 616 may comprise one or more smaller central processing units, including, for example, a programmable digital signal processing engine or gate array logic device such as a PLD or ASIC device. The processing unit 616 may also be implemented as a single application specific integrated circuit (ASIC) to improve speed and to economize space.

The processing unit 616 may perform similar functions as those of the gateway 202, gateway 302, gateway 402, or gateways 506, 510. For example, the processing unit 616 may include an amplification function, an attenuation function, a double-talk detection function, an adaptive filtering function, a summation function, a power level comparison function, a signal generation function, and others as well. These functions, and additional functions if present, of the processing unit 616 may be provided using machine language instructions, assembly instructions, or higher-level software languages such as software with object-oriented instructions, such as the C++ programming language. However, other programming languages (ANSI C, FORTRAN, etc.) could be used as well.

The data storage 618 may include main memory and secondary storage. The main memory may include random access memory (RAM). Main memory can also include any additional or alternative memory device or memory circuitry. Secondary storage can be provided as well and may be persistent long term storage, such as read only memory (ROM), optical or magnetic disks, compact-disc read only memory (CD-ROM), or any other volatile or non-volatile storage systems. The machine language instructions comprising the functions of the processing unit 616 may be stored in the data storage 618.

The system 600 may be able to transmit $R_{OUT}$ signals to the network 604 and receive $S_{IN}$ signals from the network 604. The $S_{IN}$ signals received from the network 604 may comprise echo signals. The processing unit 616 may be able to process $S_{IN}$ signals received from the network 604 and forward them to the IP network.

Figure 7:
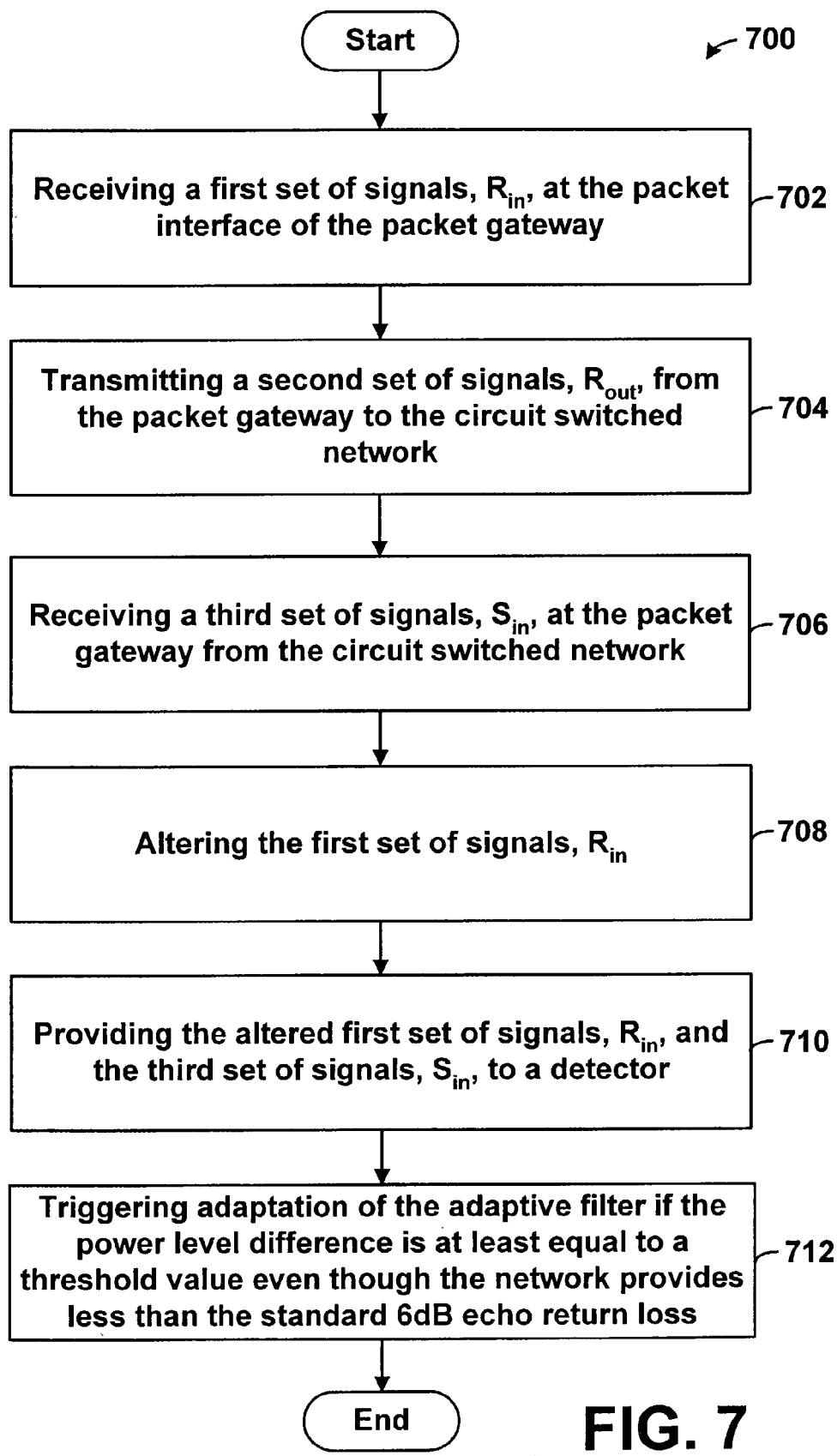
FIG. 7 depicts one embodiment of functional blocks of the gateway employed in the exemplary embodiment of the present invention.

FIG. 7 is a flowchart generally illustrating a method 700 relating to triggering adaptation of adaptive filters in echo cancellers of gateways described herein. As shown at block 702, a first set of signals, $R_{IN}$, is received at the packet interface of a packet gateway. Subsequently, as shown at block 704, a second set of signals, $R_{OUT}$, that has a given power level is transmitted from the gateway to the circuit switched network. The second set of signals, $R_{OUT}$, may be amplified, prior to sending to the echo canceller's tap delay line, or attenuated prior to transmission to the circuit switched network. A third set of signals, $S_{IN}$, is then received at the gateway from the circuit switched network, as shown at block 706. The circuit switched network echo path likely provided an echo return loss on the $S_{IN}$ signals prior to the gateway receiving them. The network may provide less than a standard 6 dB echo return loss so that the $S_{IN}$ signals have an echo component that is less than 6 dB different from $R_{OUT}$.

The first set of signals, $R_{IN}$, may then be altered, as shown at block 708. The first set of signals, $R_{IN}$, are altered preferably by attenuating or amplifying the signals to change a power level of the signals and allowing the echo canceller to trigger adaptation of the adaptive filter. The altered $R_{IN}$ signals and the $S_{IN}$ signals are then provided to a detector, such as a DTD, as shown at block 710. The detector compares signal power levels to establish a power level difference. Lastly, adaptation of the adaptive filter is triggered if the power level difference is at least equal to a threshold value even though the network provides less than the standard 6 dB echo return loss, as shown at block 712.

Figure 8:
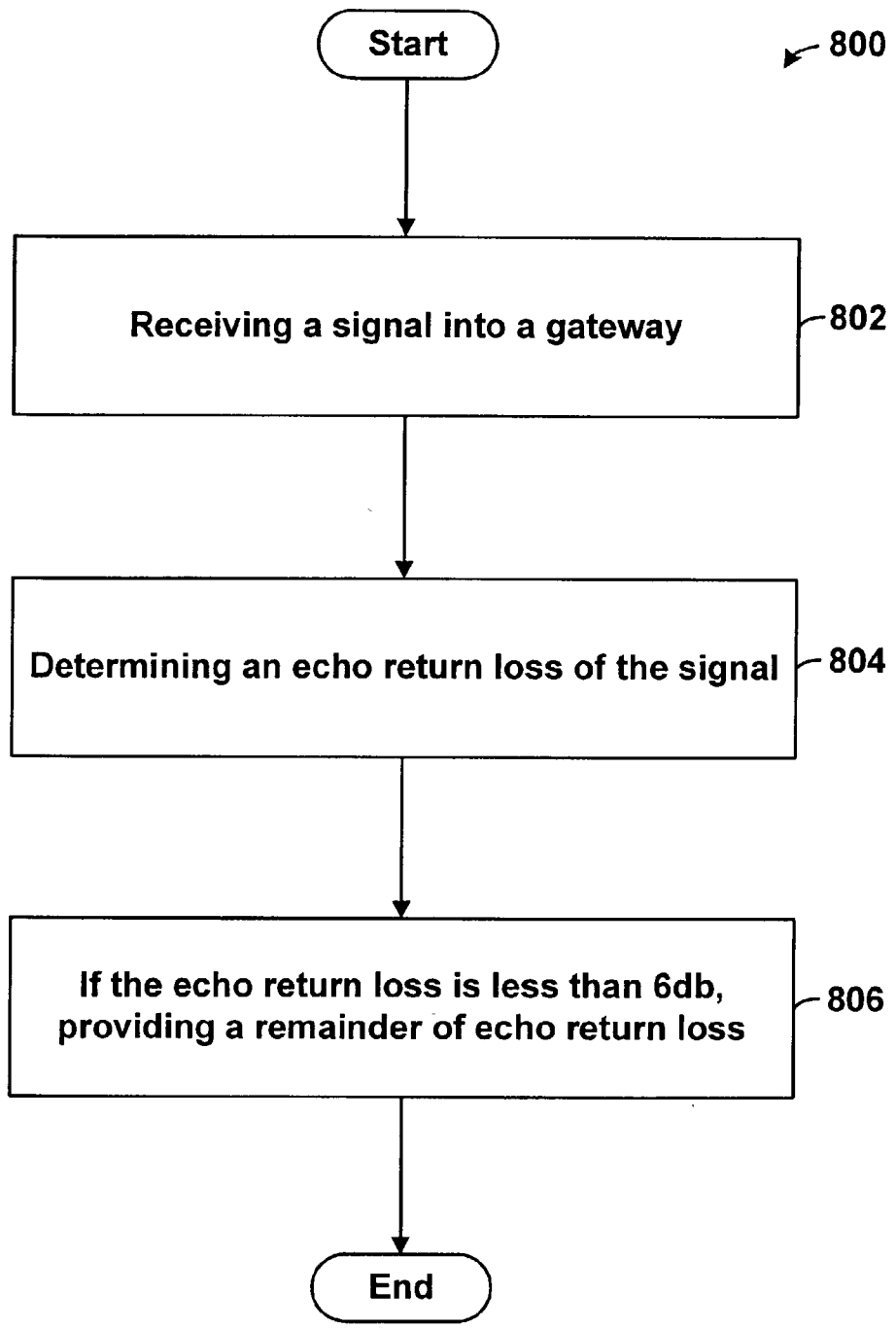
FIG. 8 depicts another embodiment of functional blocks of the gateway employed in the exemplary embodiment of the present invention.

FIG. 8 is a flowchart illustrating a method 800 of modifying the attenuating or amplifying of the signals. As shown at block 802, the gateway 602 may receive an $R_N$ signal along the input signal path 612. The gateway 602 may send the signal to the network 604, which may forward the signal to a communication device. The network 604 may also generate an echo signal, which can be sent to the gateway 602 along the $S_{IN}$ signal path 614.

The gateway 602 may receive the echo signal along the $S_{IN}$ signal path 614 and determine an ERL of the echo signal provided by the network 604, as shown at block 804. As shown at block 806, if the ERL is less than 6 db, the gateway 602 may provide additional echo return loss, or apparent ERL, such that both the ERL provided by the network 604 and the apparent ERL provided by the gateway 602 are at least 6 dB. The gateway 602 may then trigger adaptation by the processing unit 616 once a sufficient amount of ERL has been provided.

The gateway 602 may provide the remainder of ERL using an attenuation means or amplification means as described in relation to gateways 202, 302, 402, and 506, 510. The remainder of ERL may be provided on a signal prior to the gateway 602 transmitting the signal to the network 604, after receiving the return signal from the network, or a combination of both. For example, prior to transmitting a signal to the network 604, the gateway 602 may initially attenuate the signal. Or, the gateway 602 may attenuate a return signal received from the network 604 prior to determining whether to trigger adaptation or not.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims. Consequently, modifications of structure, sequences and the like apparent to those skilled in the art would still fall within the scope of the invention.

For example, while the foregoing description is presented in terms of an industry standard 6 dB ERL, any desired ERL may be implemented according to consumer preferences. Likewise, the values of the gain and attenuation provided by amplification and attenuation means of the system discussed herein may be modified accordingly.

Additionally, although the foregoing description focuses on telephones communicating with each other through a system, any telecommunication device may be used. Furthermore, any type of signals may be sent through the system rather than or in addition to speech signals.

I claim:

1. A gateway comprising:
   a network interface operable to transfer signals to a voice communication device via a network which provides an echo return loss (ERL) on the signals; and
   a processing unit coupled to the network interface, the processing unit being operable to transmit a signal to the network interface and receive a return signal from the network interface, the processing unit having an echo canceller including an adaptive filter in order to cancel echo signals within the return signal, wherein the processing unit requires a specified amount of power level difference between the transmitted signal and the return signal in order for the processing unit to trigger adaptation by the adaptive filter,
   wherein the processing unit provides an apparent ERL on the return signal so as to provide a portion of the specified amount of apparent power level difference in order for the processing unit to trigger adaptation by the adaptive filter.

2. The gateway of claim 1, wherein the processing unit requires a specified amount of ERL to be provided on the return signal in order to trigger adaptation by the adaptive filter, and wherein the network provides a portion of the specified amount of ERL and the processing unit provides a remainder of the specified amount of ERL.

3. The gateway of claim 2, wherein the remainder of the specified amount of ERL is the apparent ERL.

4. The gateway of claim 1, wherein the gateway compares a power level of the transmitted signal with an apparent power level of the return signal in order to determine the apparent ERL.

5. The gateway of claim 1, wherein the ERL provided by the network on the signals is less than 6 dB.

6. The gateway of claim 1, wherein the apparent ERL provided by the processing unit is in the range of 0-3 dB.

7. The gateway of claim 1, wherein the specified amount of power level difference between the transmitted signal and the return signal is approximately 6 dB.

8. The gateway of claim 1, wherein the ERL provided by the network and the apparent ERL provided by the processing unit together are at least approximately 6 dB.

9. The gateway of claim 1, wherein the processing unit comprises:
   an attenuation means coupled to the echo canceller and being operable to provide the apparent ERL; and
   a double talk detector coupled to the echo canceller and the attenuation means, the double talk detector being operable to determine the specified amount of apparent power level difference between the transmitted signal and the return signal so as to trigger adaptation by the adaptive filter.

10. The gateway of claim 9, wherein the attenuation means causes the detector to trigger adaptation by the adaptive filter when the ERL provided by the network is less than 6 dB.

11. The gateway of claim 9, wherein the attenuation means is performed by a bit-shifting register.

12. The gateway of claim 9, wherein the attenuation means decreases a magnitude of the transmitted signal so that the network interface receives an attenuated transmitted signal.

13. The gateway of claim 1, wherein the processing unit comprises:
   an amplification means coupled to the echo canceller and being operable to increase a magnitude of the transmitted signal so as to produce an amplified signal and thereby provide the apparent ERL on the return signal; and
   a double talk detector coupled to the echo canceller and the amplification means, the double talk detector receiving the amplified signal from the amplification means and determining an apparent power level difference between the amplified signal and the return signal so as to determine when to trigger adaptation by the adaptive filter.

14. The gateway of claim 13, wherein the amplification means causes the detector to trigger adaptation by the adaptive filter when the ERL provided by the network is less than 6 dB.

15. The gateway of claim 13, wherein the amplification means is performed by a device selected from the group consisting of an operation amplifier and a bit-shifting register.

16. The gateway of claim 1, wherein the processing unit comprises:
   an amplification means coupled to the echo canceller and being operable to increase a magnitude of the transmitted signal so as to produce an amplified signal;
   an attenuation means coupled to the amplification means and the network interface, the attenuation means being operable to receive the amplified signal from the amplification means and re-establish the magnitude of the amplified signal to that of the transmitted signal, wherein the attenuation means transfers the transmitted signal to the network interface; and
   a double talk detector coupled to the echo canceller and the attenuation means, the double talk detector receiving the amplified signal from the amplification means and comparing the amplified signal with the return signal so as to determine when to trigger adaptation by the adaptive filter.

17. The gateway of claim 16, wherein the double talk detector receives the amplified signal and determines a difference in power levels between the amplified signal and the return signal, and if the difference in apparent power levels is at least 6 dB, then the double talk detector triggers adaptation by the adaptive filter.

18. The gateway of claim 16, wherein if the difference in apparent power levels is not at least 6dB, then the double talk detector disables adaptation by the adaptive filter.

19. The gateway of claim 16, wherein the amplification means and the attenuation means together provide the apparent ERL.

20. The gateway of claim 1, further comprising:
a signal generator coupled to the network interface and being operable to transmit a tone signal to the network interface; and
a power meter coupled to the signal generator and the network interface, the power meter being operable receive a return tone signal and determine the ERL provided by the network on the return tone signal.

21. In a gateway being operable to transmit signals to a network and receive signals from the network, the gateway having an echo canceller including an adaptive filter in order to cancel echo signals within the received signals, a method comprising: providing an apparent echo return loss (ERL) on the transmitted signals by the gateway, by attenuating or amplifying power levels of signals provided to a detector, thereby providing an apparent power level difference between the transmitted and received signals; and using the detector to trigger adaptation of the adaptive filter if the apparent power level difference is at least equal to a threshold value even though the network provides less than the standard 6 dB echo return loss.

22. The method of claim 21, wherein providing the apparent ERL comprises amplifying the transmitted signals provided to the detector so as to produce amplified signals, thereby providing the apparent power level difference between the amplified signals and the received signals.

23. The method of claim 22, further comprising determining an actual ERL of the received signals and adjusting the amplifying of the transmitted signals such that the apparent ERL is approximately 6 dB.

24. The method of claim 22, further comprising attenuating the amplified signals so as to produce signals having magnitudes equivalent to the transmitted signals.

25. The method of claim 21, further comprising determining a difference in magnitudes between the amplified signals and the received signals and if the difference in magnitudes is at least 6 dB, triggering adaptation of the adaptive filter in order to provide an estimate of echo signals within the received signals.

26. The method of claim 21, wherein providing the apparent ERL comprises attenuating the transmitted signals so as to produce attenuated signals, thereby providing the apparent power level difference between the attenuated signals and the received signals.

27. The method of claim 26, further comprising determining an actual ERL of the received signals and adjusting the attenuating of the transmitted signals such that the apparent ERL is approximately 6 dB.

28. The method of claim 26, further comprising determining a difference in magnitudes between the attenuated signals and the received signals and if the difference in magnitudes is at least 6 dB, triggering adaptation of the adaptive filter in order to provide an estimate of echo signals within the received signals.

29. The method of claim 21, further comprising determining an ERL of the received signal and adjusting the apparent ERL such that the power level difference is at least equal to the threshold value.

30. The method of claim 21, wherein the threshold value is approximately 6 dB.

31. A computer readable medium having stored therein instructions for causing a central processing unit to execute the method of claim 21.

32. A gateway comprising:
a network interface operable to transfer signals to a voice communication device via a network;
a processing unit coupled to the network interface, the processing unit being operable to send a signal to the network interface and receive a return signal from the network interface; and
data storage coupled to the processing unit, the data storage storing machine language instructions that are executable by the processing unit to perform functions including:
providing an apparent echo return loss (ERL) on the signal, by attenuating or amplifying power levels of signals provided to the detector, thereby providing an apparent power level difference between the signal and the return signal; and
using the detector to establish an estimate of echo signals using the return signal if the apparent power level difference is at least equal to a threshold value.

33. The gateway of claim 32, wherein the function of providing the apparent ERL on the signal comprises amplifying the signal so as to produce an amplified signal, thereby providing the apparent power level difference between the amplified signal and the return signal.

34. The gateway of claim 33, wherein the function of providing the apparent ERL further comprises attenuating the amplified signal so as to produce a second signal having a magnitude equivalent to the signal.

35. The gateway of claim 32, wherein the function of providing the apparent ERL on the signal comprises attenuating the signal so as to produce an attenuated signal, thereby providing the apparent power level difference between the attenuated signal and the return signal.

36. In a gateway being operable to transmit signals to a network and receive signals from the network, the gateway having an echo canceller including an adaptive filter in order to cancel echo signals within the received signals, a method comprising:
receiving a first set of signals at the gateway;
transmitting a second set of signals from the gateway to the network, the second set of signals having a given power level;
receiving a third set of signals at the gateway from the network where the network provides less than a standard 6 dB echo return loss so that the third set of signals have an echo component comprising a power level greater than 6 dB less than the given power level;
altering the first set of signals;
providing the altered first set of signals and the third set of signals to a detector, wherein the detector compares the first set's and the third set's signal power levels so as to establish a power level difference; and
triggering adaptation of the adaptive filter if the power level difference is at least equal to a threshold value even though the network provides less than the standard 6 dB echo return loss.

* * * * *